Aug. 17, 1937.   A. FREDERICK   2,090,444
GLASS FACTORY AND IMPROVED FURNACE
Filed Oct. 22, 1934   7 Sheets-Sheet 4
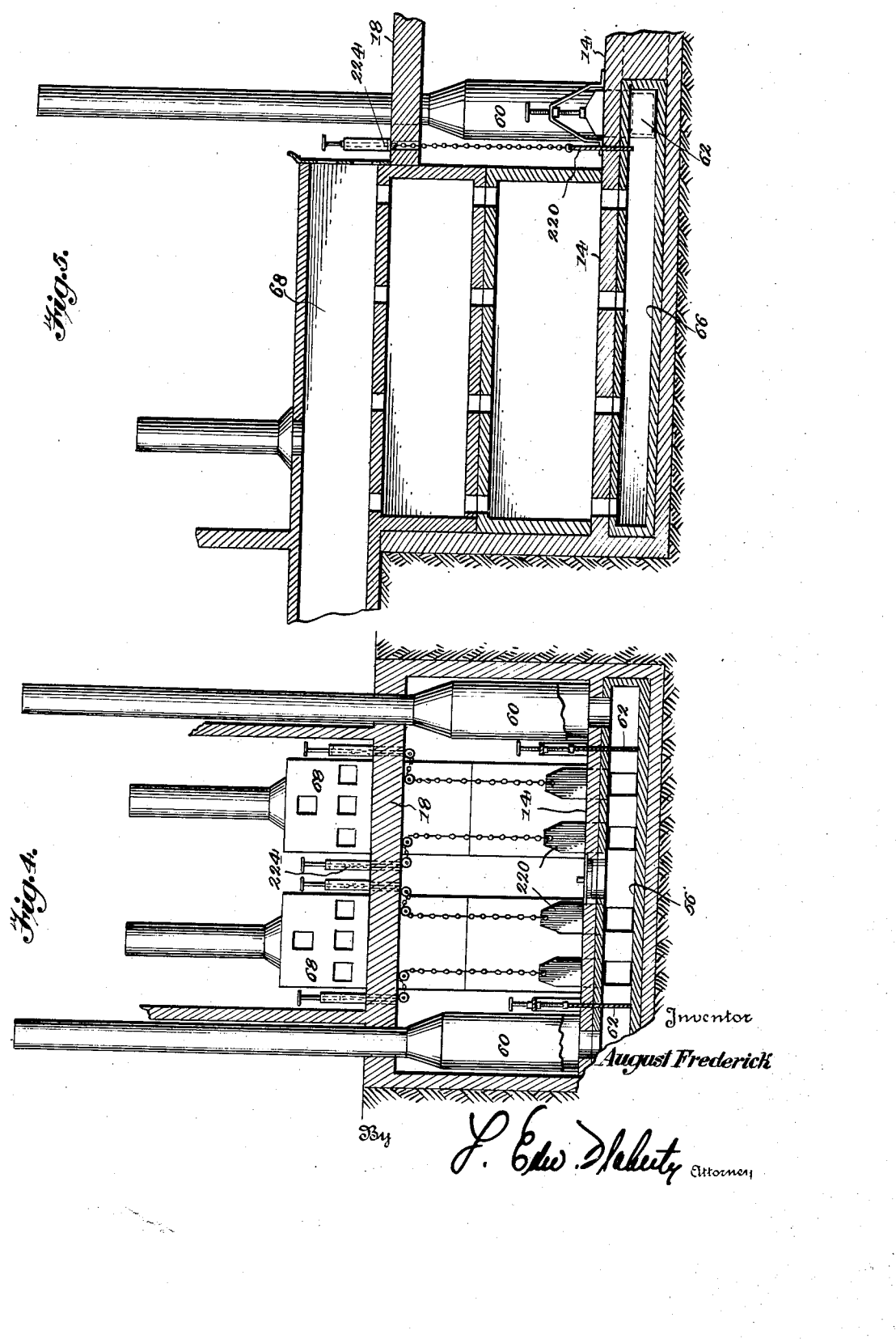

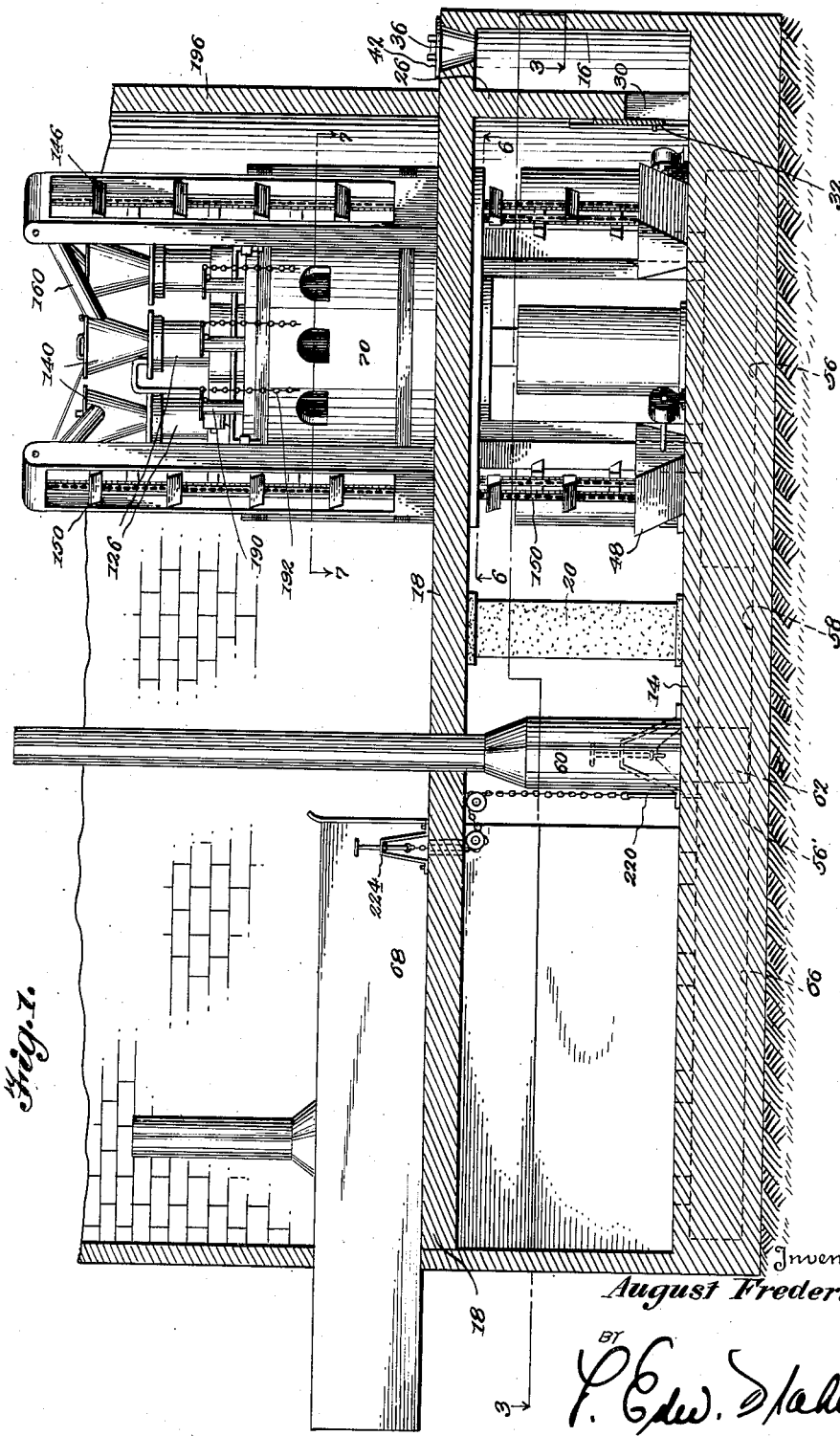

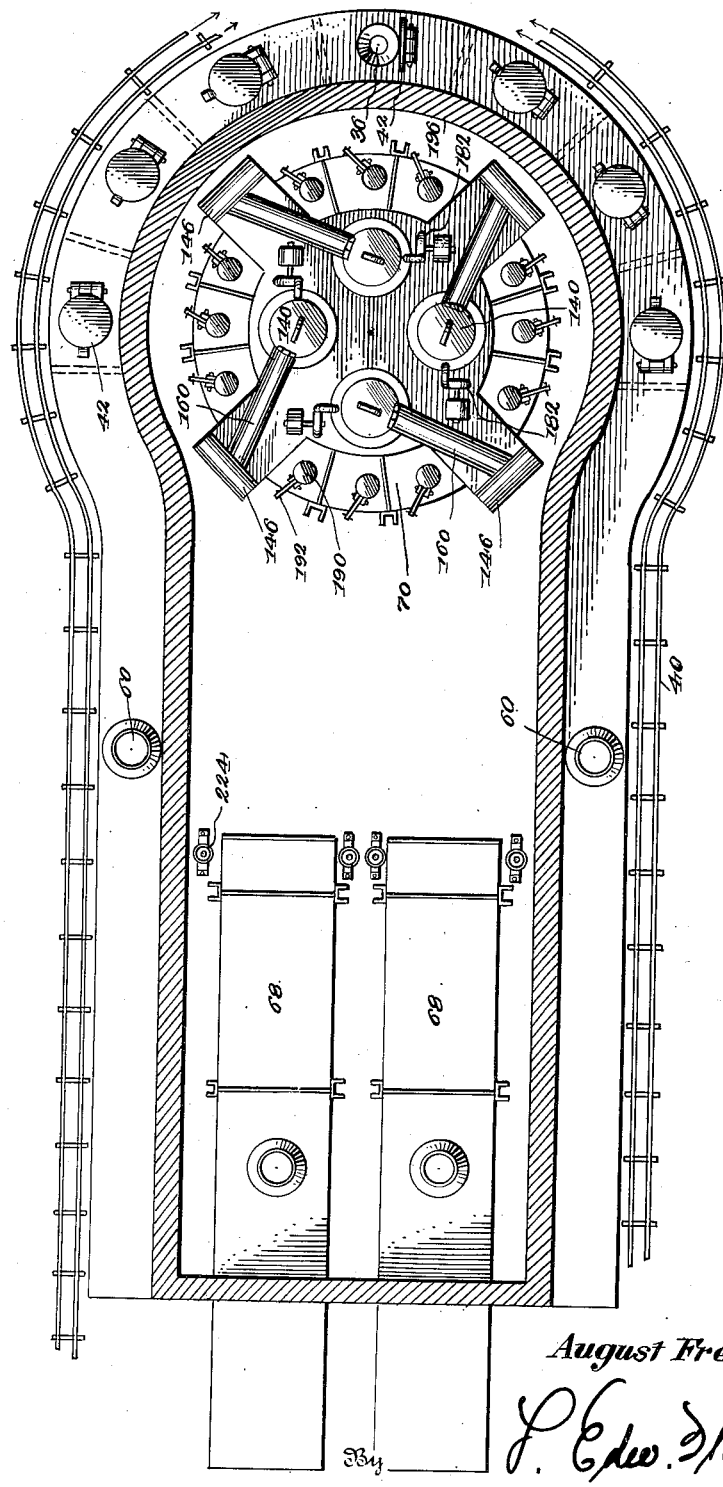

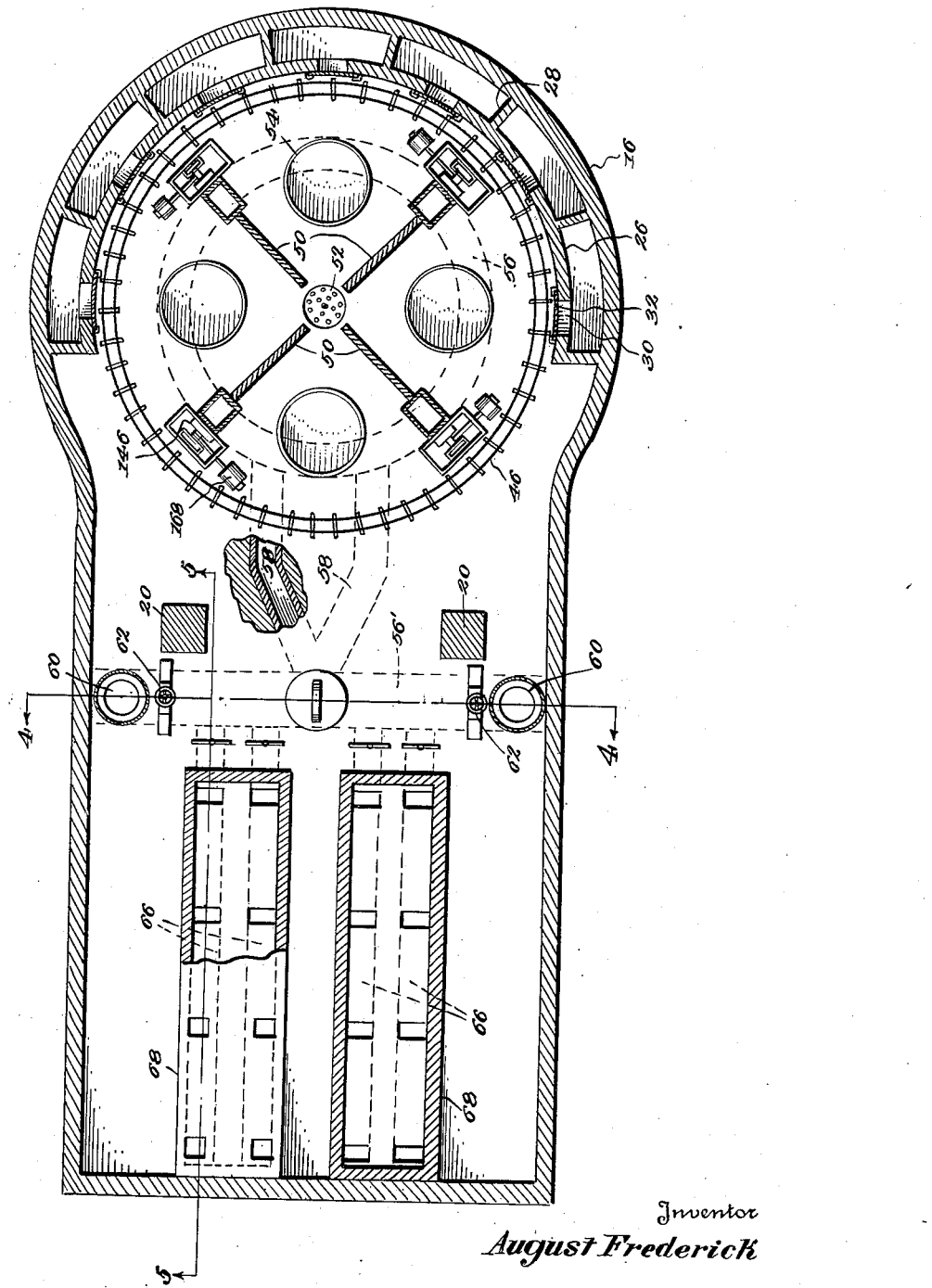

Aug. 17, 1937.  A. FREDERICK  2,090,444
GLASS FACTORY AND IMPROVED FURNACE
Filed Oct. 22, 1934  7 Sheets-Sheet 5
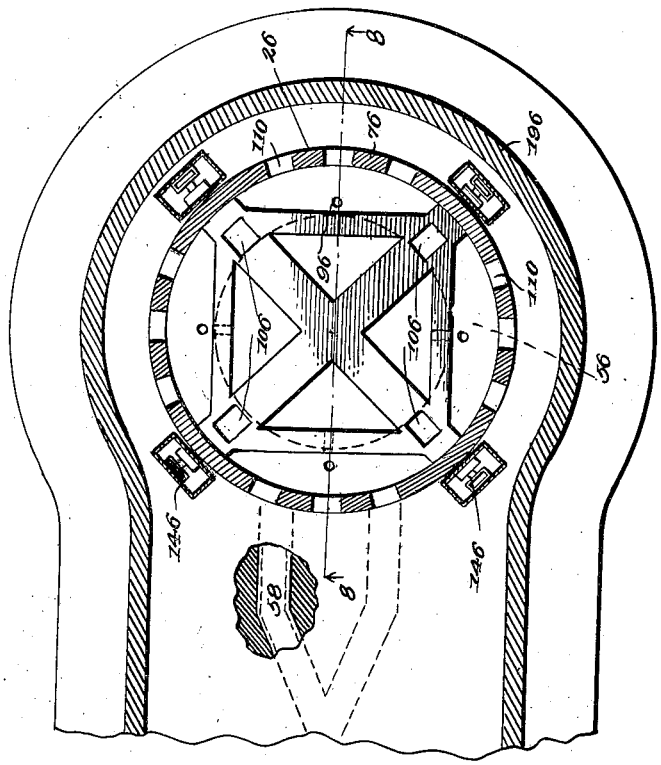
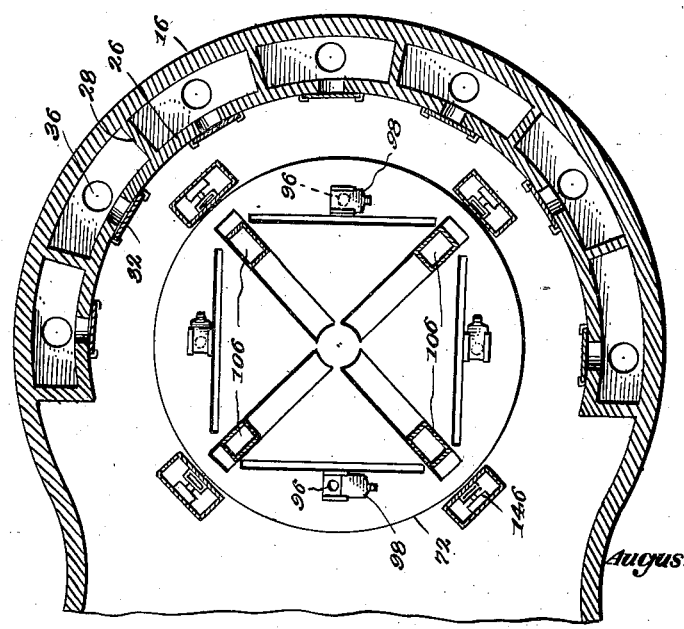
Inventor
August Frederick
By J. Edw. D'Lahuty
Attorney Aug. 17, 1937.  A. FREDERICK  2,090,444
GLASS FACTORY AND IMPROVED FURNACE
Filed Oct. 22, 1934   7 Sheets-Sheet 6
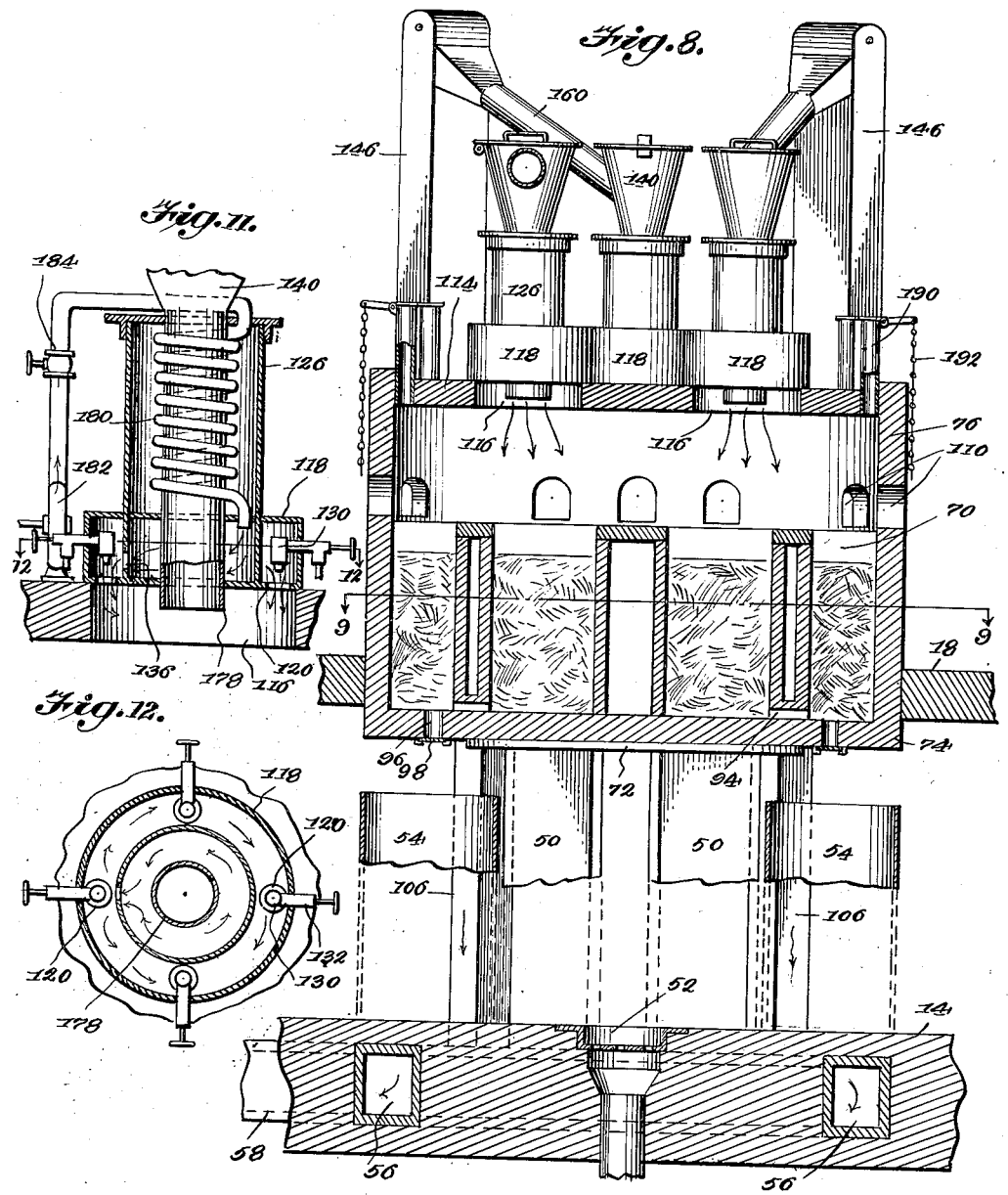
Inventor
August Frederick
By J. Edw. Flaherty
Attorney

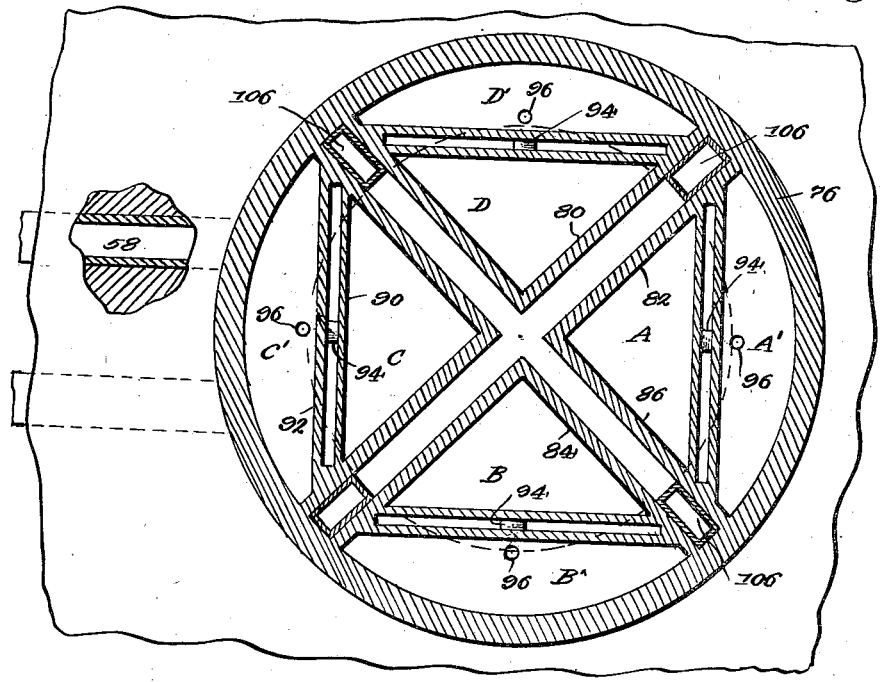

Patented Aug. 17, 1937

2,090,444

UNITED STATES PATENT OFFICE 2,090,444

GLASS FACTORY AND IMPROVED FURNACE

August Frederick, Weston, W. Va.

Application October 22, 1934, Serial No. 749,452

3 Claims. (Cl. 49—54)

The present invention relates to a furnace, and more particularly to a furnace especially adapted for making glass.

One of the objects of the present invention is to provide a glass making furnace, in which the melting tank thereof is especially adapted for making simultaneously, a plurality of different colors of glass.

A further important attribute of the invention is to provide a novelly constructed melting tank in which in case one of the sections of the tank should become inoperative, or a batch of glass should be found to be deficient, the same can be emptied therefrom into the basement without loss of time permitting the other sections of the melting tank to continue in operation.

A still further important object of the invention will be found to reside in the novel manner in which the heat which is normally lost and directed into the smoke stack of the furnace, is utilized for heating the leers and tempering the glassware.

A still further important object of the invention will be found to reside in the particular construction of the firebox, and the novel manner in which the air is caused to circulate around the batch funnel into the firebox.

In the accompanying drawings forming a part of this application, in which corresponding parts are designated by similar reference numerals throughout:—

Figure 1 is a longitudinal vertical sectional view of the furnace.

Figure 2 is a plan view of the first floor thereof.

Figure 3 is a plan view of the basement of the furnace.

Figure 4 is a vertical sectional view of Figure 3 taken on line 4—4 thereof.

Figure 5 is a vertical sectional view of Figure 3 taken on line 5—5 thereof.

Figure 6 is a fragmentary horizontal sectional view of the bottom of the melting tank shown in Figure 1 taken on line 6—6 thereof.

Figure 7 is a horizontal sectional view of the melting tank taken on line 7—7 of Figure 1 looking down as indicated by the arrows.

Figure 8 is a vertical sectional view of Figure 7 taken on line 8—8 thereof.

Figure 9 is a horizontal sectional view through the melting tank shown in Figure 8 taken on line 9—9 thereof.

Figure 10 is a vertical sectional view through the melting tank shown in Figure 9.

Figure 11 is a fragmentary vertical sectional view through the burner.

Figure 12 is a horizontal sectional view taken substantially on the line 12—12 of Figure 11.

In the accompanying drawings wherein for the purpose of illustration there is shown a preferred embodiment of the invention, and referring more particularly to Figures 1 and 3, the reference numeral 14 generally designates the basement floor of the furnace, which as clearly illustrated in Figure 3 is circular at one end, and of general rectangular shape at the other end thereof. The floor in the usual manner is constructed of fire brick, and is provided with upstanding brick side walls 16 and a second floor 18 spaced therefrom, which is constructed of brick or any other suitable material and is supported from the basement by means of the spaced columns 20.

Spaced from the circular end portion of the upstanding wall 16, is another wall 26 having a plurality of spaced partition walls 28 therein defining bins into which the different ingredients of the glass, such as soda, sand, lime, and so forth, are stored. In the wall 26 there are a plurality of spaced openings 30 adjacent the floor 14 communicating with the compartments, the openings being provided with a suitable slidable door 32 and in the first floor, as shown in Figure 1 there are spaced openings 36 of substantially funnel shape communicating with the bins, by means of which the bins may be conveniently filled from freight car or the like which conveniently pass around the second floor on the track 40 adjacent the upstanding wall of the building. Each of these openings 36 are provided with removable covers 42.

As shown in Figure 3 in the circular end portion, or the furnace portion of the factory, there is provided a circular track 46 which is disposed adjacent the bin openings 32, on which a car or the like is moved to facilitate of the mixing of the batch from the bin into the mixing containers 48 which are disposed on the ground floor of the factory.

Referring now to Figures 3 and 8 it will be seen that there are provided centrally of the circular portion of the factory, within the circular track, upstanding radially disposed metallic furnace supports 50 and centrally of the supports, within the basement there is disposed a sewage outlet 52. Between each of the upstanding supports 50 there are arranged the usual water tanks 54.

As clearly shown in Figures 1 and 3 in the basement floor 14 there is provided a circular canal 56 communicating with a centrally transversely disposed canal 56' through the medium of the branch canals 58. The canal 56 as clearly shown in Figure 3 communicates with the smoke stack 60 disposed on each end thereof and communication of the smoke and draft from the canal 56 is controlled through the medium of the operated valve 62 disposed in the canal 56 adjacent each stack.

Similarly in the basement floor there is provided pairs of spaced longitudinally disposed canals 66 communicating with the canal 56 for supplying heat from the furnace to the leers 68. This will be more fully hereinafter described.

As clearly shown in Figure 8 the floor 18 which will be hereinafter referred to as the working floor of the factory in the circular end, is provided with a circular opening, into which there is disposed the circular furnace 70 and which rests upon a perforated plate 72 on the supports 50. The furnace is provided with a bottom 74 and a circular upstanding wall 76, the bottom and wall in the usual manner being constructed of fire brick and as clearly illustrated in Figure 9 the furnace is divided into four glass melting sections A, B, C, and D through the medium of the radially disposed spaced walls 80, 82; 84 and 86. The walls as clearly illustrated in Figure 8 extend from the bottom of the furnace upwardly to a point just beyond the mid-point of the wall 76 of the furnace. Adjacent each melting chamber A, B, C, and D are the working chambers A', B', C' and D' which are defined by the spaced walls 90 and 92 secured to the radially disposed spaced walls. Each melting chamber, as clearly illustrated in Figures 8 and 9 communicates with its adjacent working chamber through the medium of the bores 94 adjacent the bottom of the furnace.

In the bottom of the furnace 74 there are provided openings 96 with slidable gates 98 permitting of the glass, when so desired, such for example when there is a bad batch, to be emptied from the working chambers through the openings into a water tank 54. The openings 96 obviously are disposed directly above each water tank.

The heat from the space between the walls 80, 82; 84, 86, is communicated to the canal 56 through the medium of four downdrafts 106 disposed between the walls as clearly illustrated in Figure 9. Cover plates of fire brick extend across the walls 80, 82; 84, 86 as illustrated in Figures 7 and 8. As clearly shown in Figure 8 in the upstanding wall 76 of the furnace there are provided directly above the working chambers spaced work openings 110 from which the molten glass is taken for producing glass articles by the workmen. The furnace is provided with a top 114 constructed of the usual fire brick material, and directly above each melting section or chamber there is provided the heat inlet apertures 116. Upon the top of the top of the furnace directly above, each fire inlet aperture 116 there is disposed a cylinder shaped firebox 118. The firebox as shown in Figure 11 is provided with a plurality of openings 120 in the bottom portion thereof, and a centrally disposed opening having an upstanding cylindrical support 126 therein. Within the space between the wall of the support 126 and the outer wall of the firebox 118 there are spacedly arranged gas burners 130 which are controlled through the medium of a valve 132, the gas being supplied to the furnace from a source of gas supply. The firebox 118 communicates with the interior of the cylindrical support 126 through the medium of spaced openings 136 and the fire is directed downwardly on the glass. Within the upstanding cylindrical support 126 there depends the funnel 140 into which the batch of glass is inserted through the elevators 146. As shown the batch of glass after being mixed from the bins into the mixing boxes or containers 48 is transmitted by means of an endless belt 150 of the elevators 146 through the chute 160 into the funnel 140 where it enters its respective melting chamber.

It will be seen that there is provided an elevator 146 adjacent each funnel, the elevator being driven by an electrical motor 168 in the usual fashion.

As will be clearly observed in Figure 11 the depending portion 178 of the funnel 140 is spaced from the support 126 and is encircled by a plurality of convolutions of a coil 180 which is supplied with air through the medium of a pump 182. The air is controlled by means of the valve 184. Normally each of the funnel shaped batch feeders are supplied with lids 186 which are removable when it is desired to supply the melting chambers with batches from their respective elevator.

Adjacent each furnace on the second floor there is an upstanding wall 196 which is of substantially the same shape as the ground floor, and to the rear there are arranged the leers 68 through which the finished product is passed in the usual manner for the purpose of tempering. Normally the leers are supplied with heat from a separate source through the medium of burners or the like and it is one of the salient features of the present application to overcome this expensive construction by providing the leers with heat from the melting chambers of the furnace. This heat is normally through the medium of the stack 60 passed off into the atmosphere. Obviously, the leers may be equipped with special heating apparatus, and when it is desired not to use the same, and to heat the same from the heat of the furnace, the valve gates 62 are moved to the downward position indicated in Figure 4 and the valve gates 220 opened by means of the control mechanism 224 the heat passing from the melting chambers through the channel 58 into the channel 56' where it is directed through the conduit 66 into the leers. Obviously the amount of heat from the melting furnace to the leers may be controlled by the adjustment of the respective regulating gates or valves 220. It is to be noted in this connection as shown in Figure 7 the downdrafts 106 communicating the hot air from the melting chambers into the circular shaped channel 56 are open at the top.

It will thus be seen that there is provided a factory for making glass, in which the different ingredients of the glass may be conveniently mixed on the basement floor and carried by means of a motor actuated elevator into a funnel shaped trough where the different batches for different colored glass may simultaneously or individually be melted and worked in the same furnace. It is also apparent in case a batch in one section is found to be bad that batch may be selectively discharged through a conveniently arranged aperture into a water tank directly below the melting chamber. This can be effected without interfering with the operation of the remaining melting chambers.

By virtue of the novel arranged channels, and the communicating downdrafts, the heat from the furnace, is utilized to heat the leers in which the finished product is annealed or tempered.

While there is shown for the purpose of illustration a preferred embodiment of the invention, it is to be understood that it is capable of various changes and modifications without departing from the spirit thereof, and it is intended therefore, that only such limitations shall be imposed thereon, as are indicated in the prior art or in the appended claims.

What is claimed is:—

1. In a glass factory, a basement floor provided adjacent one end thereof with a circular canal and a plurality of mixing containers disposed on said floor in a circular series circumjacent the canal, a glass melting furnace supported above said floor at the last named end thereof for receiving the contents of said mixing containers, said furnace being provided with a plurality of glass melting sections defined by a plurality of radially disposed, internal, spaced walls, tempering leers mounted above said basement floor at the end thereof remote from the mixing containers, down drafts extending downwardly from the spaces between opposed aforementioned melting section-defining walls to said circular canal for conducting heat from the furnace to said circular canal, additional canals connecting the circular canal with said leers for conducting heat to the leers, said additional canals including a transverse canal, vertical smoke stacks connected with the transverse canal at the respective opposite ends of the latter, and valves arranged within said transverse canal inwardly from said ends of the latter.

2. In a glass factory, a basement floor provided adjacent one end thereof with a plurality of mixing containers disposed on the basement floor, a glass melting furnace supported above said basement floor at the last named end thereof and provided internally with a plurality of relatively spaced, radially disposed walls defining within the furnace a plurality of glass melting sections adapted to receive the contents of the mixing containers, tempering leers above said basement floor at the end thereof remote from the mixing containers, a circular canal in the basement floor below said furnace, down drafts extending downwardly from the spaces between the aforementioned radially extending walls to said circular canal for conducting heat from the furnace to said canal, a transverse canal in said basement floor intermediate the ends of the latter, branch canals connecting the circular and transverse canals together, and longitudinal canals connecting the transverse canal with said leers for conducting heat from the furnace to said leers.

3. In a glass factory a basement floor provided in one end thereof with a circular canal, a furnace mounted above said basement floor at said one end and provided internally with a plurality of walls defining a plurality of non-communicating glass melting sections, said walls being arranged to provide between the sections spaces, down drafts extending downwardly from the spaces between said glass melting sections to said circular canal for conducting heat from the furnace to said canal, glass tempering leers mounted above the basement floor at the end thereof remote from the circular canal, smoke stacks rising from the basement floor adjacent opposite edges thereof intermediate the respective opposite ends of the basement floor, and a plurality of inter-communicating canals connecting the circular canal with said smoke stacks and with said leers, and means for controlling the flow of heat through said canals.

AUGUST FREDERICK.